Feb. 14, 1961 H. M. GEYER 2,971,496
FLUID PRESSURE ACTUATOR AND COOLING MEANS THEREFOR
Filed June 9, 1958
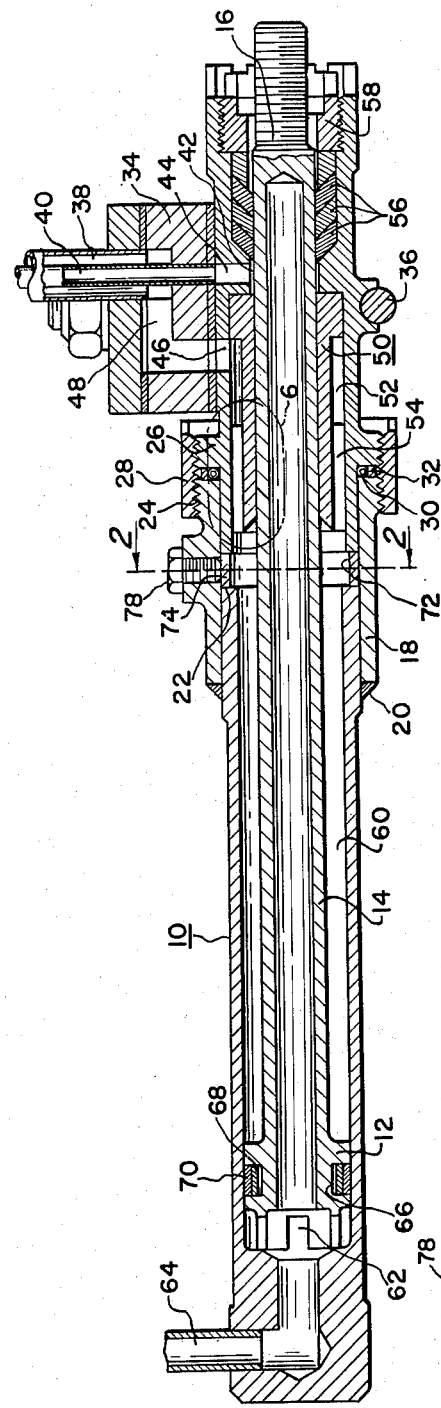
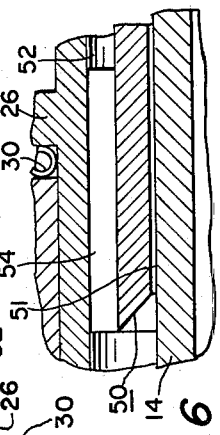
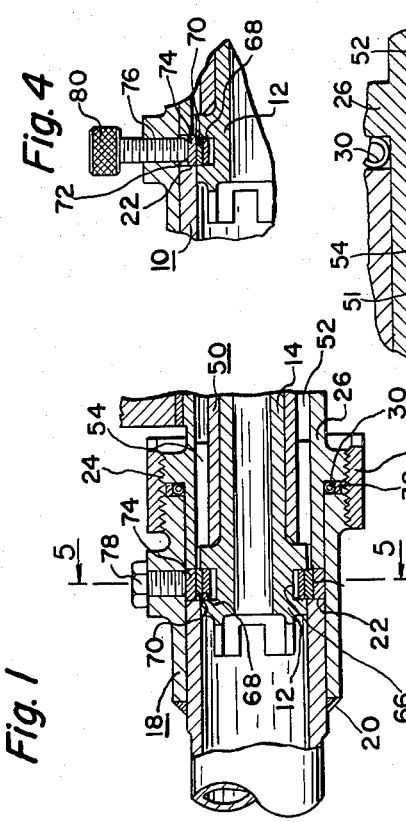
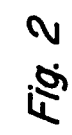
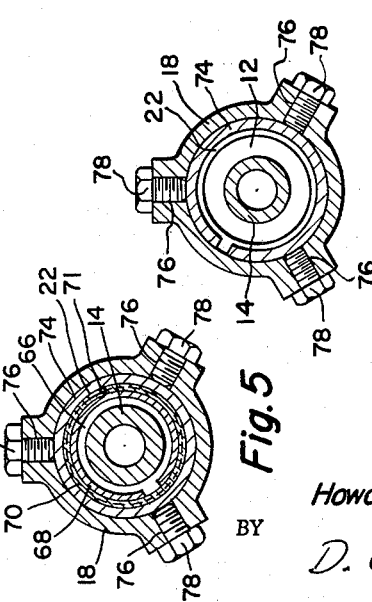
INVENTOR.
Howard M. Geyer.
BY
D. C. Staley
His Attorney.

United States Patent Office 2,971,496
Patented Feb. 14, 1961

2,971,496

FLUID PRESSURE ACTUATOR AND COOLING MEANS THEREFOR

Howard M. Geyer, Dayton, Ohio, assignor to General Motors Corporation, Detroit, Mich., a corporation of Delaware Filed June 9, 1958, Ser. No. 740,845

3 Claims. (Cl. 121—38)

This invention pertains to actuators and particularly to a fluid pressure operated linear actuator having stroke end locking means.

In actuators designed for use in missiles, it is only necessary to effect one operation of the actuator. Accordingly, the actuators must be reliable, of simple design and capable of being periodically checked for operability. The present invention relates to a fluid pressure operated linear actuator having simplified stroke end locking means, and thus constitutes an improvement over the actuator disclosed in my Patent No. 2,815,005. In addition, the actuator includes means for circulating oil through one actuator chamber for cooling, and means for preventing the congealing of oil in the drain conduit due to high ambient temperatures. Accordingly, among my objects are the provision of a fluid pressure operated actuator including releasable stroke end locking means; the further provision of linear actuator assembly including a cylinder and a piston, the piston having split metallic piston ring means which are engageable with a locking shoulder on the cylinder at one stroke end; the further provision of an actuator assembly of the aforesaid type including manually operable means for releasing the locking means; and the still further provision of a fluid pressure operated actuator having means for circulating fluid for actuator cooling and preventing the clogging of the drain conduit.

The aforementioned and other objects are accomplished in the present invention by incorporating a split lock release ring in the actuator for compressing the piston ring means to release the stroke end locking means. Specifically, the actuator includes a cylinder having a reciprocable piston therein. The piston is formed with an integral rod which extends outside of the cylinder and is adapted for connection to a suitable load device. One end of the cylinder is formed with a flange, or shoulder, and the piston carries a pair of split metallic piston rings, the outer of which expands and engages the shoulder to securely lock the piston against movement in the fully extended position.

The cylinder also includes a split metallic lock releasing ring which can be compressed by a plurality of manually operable lock releasing screws so as to press the piston rings back into the groove of the piston and thereby disengage the outer piston ring from the locking flange. The lock releasing screws can be removed and replaced by cap screws for sealing the actuator cylinder against leakage.

The actuator also includes a rod end pressure drop bushing, the inner diameter of which is radially spaced from the piston rod so as to form an orifice through which a metered amount of fluid can flow from one of the actuator chambers to drain due to a pressure differential across the pressure drop bushing, the assembly being of the general type shown in my copending application Serial No. 648,361 filed March 25, 1957. The low pressure side of the pressure drop bushing is connected to a drain conduit. In order to prevent the congealing of oil in the drain conduit due to high ambient temperatures, the drain conduit is disposed within the retracted conduit whereby the flow of oil through the retract conduit will cool the drain conduit, thereby assuring circulation of fluid through the actuator for cooling purposes.

Further objects and advantages of the present invention will be apparent from the following description, reference being had to the accompanying drawings, wherein a preferred embodiment of the present invention is clearly shown.

In the drawing:

Figure 1 is a longitudinal view, partly in section and partly in elevation, depicting an actuator constructed according to the present invention.

Figure 2 is a sectional view taken along line 2—2 of Figure 1.

Figure 3 is a fragmentary view, partly in section and partly in elevation, with the actuator piston locked in the extend stroke end position.

Figure 4 is a fragmentary sectional view, similar to Figure 3, illustrating the manner in which the stroke end locking means are manually released.

Figure 5 is a sectional view taken along line 5—5 of Figure 3.

Figure 6 is an enlarged view taken within the circle 6 of Figure 1.

With particular reference to Figure 1, a fluid pressure operated linear actuator is shown including a cylinder 10 having disposed therein a reciprocable piston 12. The piston 12 is formed with an integral hollow rod 14 having a closed outer end 16 which extends outside of the cylinder and is adapted for connection to a load device, not shown. The cylinder 10 has an annulus 18 attached thereto by welding as indicated by numeral 20, this end of the cylinder terminating in an abrupt shoulder, or flange, 22. The annulus 18 is externally threaded, as indicated by numeral 24 and is attached to a rod end cap 26 by a nut 28. A metallic O ring 30 and a spacer ring 32 are interposed between the annulus 18 and the end cap 26. The rod end cap 26 has a porting block 34 suitably attached thereto by means of a U-shaped clamp 36. The porting block 34 connects with a retract conduit 38 having coaxially disposed therein a drain conduit 40. The drain conduit 40 communicates with an annular groove within the rod end cap 26 through a passage 44. The retract conduit 38 connects with a port 46 in the rod end cap 26 through a passage 48.

A pressure drop bushing 50, the inner diameter of which is slightly radially spaced from the outer periphery of the rod 14 is disposed in the annular space between the rod end cap and the piston rod. The pressure drop bushing is formed with an external annular groove 52 which connects with the actuator cylinder 10 through a plurality of axial slots 54. An orifice 51, as seen in Figure 6, is formed between the inner diameter of the pressure drop bushing and the outer periphery of the piston rod through which a metered amount of fluid can flow due to a pressure differential across the pressure drop bushing.

The rod end cap 26 also carries a plurality of low pressure metallic sealing rings 56 which engage the outer periphery of the piston rod and are held in position by a nut 58. The piston 12 divides the cylinder 10 into a retract chamber 60 and an extend chamber 62. The retract chamber 60 is connected to retract conduit 38 through the axial slots 54 and the annular groove 52 in the pressure drop bushing, port 46 and passage 48. The extend chamber 62 is connected to an extend conduit 64 as shown in Figure 1. The actuator is normally held in the fully retracted position by supplying oil to the retract chamber 60 through the retract conduit 38 while the extend chamber 62 is connected to drain through extend conduit 64. The conduit 40 is always connected to drain, such that a pressure differential normally exists across the pressure drop bushing 50 whereby a metered amount of fluid will circulate from the retract chamber 60 through the orifice means 51 between the pressure drop bushing 50 and the outer periphery of the rod 14 to the annular groove 42. This flow of cooling oil will flow through passage 44 and the conduit 40. By positioning the drain conduit 40 within the retract conduit 38, the drain conduit 40 will be cooled by the oil in the retract conduit so as to prevent the congealing of oil therein due to high ambient temperatures.

The piston 12 has an annular groove 66 within which a pair of split metallic piston rings 68 and 70 are disposed. The piston rings 68 and 70 tend to expand, and thus the ring 70 normally sealingly engages the bore of the cylinder 10. When the extend chamber 62 is connected to pressure and the retract chamber 60 is connected to drain, the piston 12 will move to the right, as viewed in Figure 1. When the piston 12 is moved from the position of Figure 1 to the position of Figure 3, the piston rings 68 and 70 are aligned with an annular groove 72 between the end of the cylinder 10 and the end of the rod end cap 26. Accordingly, the piston rings 68 and 70 will expand outwardly into the annular groove 72 so that the piston ring will engage the shoulder, or flange, 22 of the cylinder 10 thus locking the piston in the fully extended position as shown in Figure 3. When the piston rings 70 and 68 expand outwardly oil can flow from the extend chamber 62 to the retract chamber since the piston ring seal is no longer effective, and thus oil will continue to circulate through the actuator thereby cooling the actuator, and through the retract conduit 38 so as to cool the drain conduit 40. A passage 71 is formed between the ends of the split piston ring 70 permitting this oil circulation between the opposed actuator chambers, as clearly shown in Figure 5.

A split metallic lock releasing ring 74 is disposed within the annular groove 72. The piston ring 70 engages the ring 74 when the actuator is locked in the fully extended stroke end position as shown in Figure 3. The ring 74 can be compressed to compress the piston rings 70 and 68 so that the piston ring 70 will be moved out of the annular groove 72 and disengaged from the shoulder 22 as shown in Figure 4 to release the stroke end lock. In order to accomplish this result, the annulus 18 is formed with three threaded openings 76 spaced 120° apart. Normally, these openings are closed and sealed by cap screws 78. However, in order to check the operability of the stroke end locking means, which prevent retraction of the actuator piston under load, the cap screws 78 can be removed, and lock releasing screws such as indicated by numeral 80 in Figure 4 can be threaded into the openings 76. The lock releasing screws 80 have longer shanks than the cap screws 78 whereby inward movement of the lock releasing screws will compress the lock releasing ring 74 so that the inner surface thereof engages the periphery of the ring 70 of piston 12. When the inner periphery of the ring 74 engages the outer periphery of the piston ring 70, the outer piston ring 70 will be compressed to the diameter of the piston 12 thereby disengaging it from the shoulder 22 and releasing the stroke end lock. Accordingly, when the stroke end lock is released the piston 12 can be moved in the retract direction from the position of Figure 3 to the position of Figure 1.

While the embodiment of the invention as herein disclosed constitutes a preferred form, it is to be understood that other forms might be adopted.

What is claimed is as follows:

1. A fluid pressure operated actuator including, a cylinder, a reciprocable piston disposed in said cylinder, said piston dividing said cylinder into an extend chamber and a retract chamber, said piston having an expandable piston ring means engaging the bore of said cylinder and normally preventing flow of fluid between said chambers, said cylinder having an annular groove of larger diameter than the bore of said cylinder so as to form an internal shoulder, said piston ring means being expandable into said annular groove and engageable with said shoulder for locking the piston against movement, said piston ring means permitting flow of fluid between said chambers when said piston ring means are within said annular groove, said piston including a rod extending outside of said cylinder, a pressure drop bushing disposed between an end wall of said cylinder and the outer periphery of said rod, the inner surface of said pressure drop bushing being radially spaced from the outer periphery of said rod so as to form an orifice through which a metered amount of fluid can flow due to a pressure differential across said bushing, an extend conduit connected with said extend chamber, a retract conduit connected with said retract chamber, and a drain conduit connected with said orifice and disposed within said retract conduit whereby the flow of fluid through said retract conduit will cool said drain conduit.

2. A fluid pressure operated actuator including, a cylinder, a reciprocable piston disposed within said cylinder having a rod extending therefrom, said piston dividing said cylinder into two chambers, conduit means for supplying and draining fluid from each chamber, a pressure drop bushing disposed between an end wall of said cylinder and the outer periphery of said rod, the inner surface of said pressure drop bushing being radially spaced from the outer periphery of said rod so as to form an orifice through which a metered amount of fluid can flow due to a pressure differential across said bushing, and a drain conduit connected with said orifice and disposed within one of said conduit means whereby the flow of fluid through said one conduit means will cool said drain conduit.

3. A fluid pressure operated actuator including, a cylinder, a reciprocable piston disposed within said cylinder and having a rod extending therefrom, said piston dividing said cylinder into opposed chambers, conduit means for supplying and draining fluid from each chamber, orifice means between an end wall of said cylinder and the outer periphery of said rod through which a metered amount of fluid can flow due to a pressure differential thereacross, and a drain conduit connected with said orifice means and disposed within one of said conduit means whereby the flow of fluid through said one conduit means will cool said drain conduit.

References Cited in the file of this patent

UNITED STATES PATENTS

| 1,776,974 | Henderson | Sept. 30, 1930 |
| 2,390,602 | Maier | Dec. 11, 1945 |
| 2,711,157 | Halward | June 21, 1955 |
| 2,761,425 | Bertsch | Sept. 4, 1956 |
| 2,809,611 | Van Meter | Oct. 15, 1957 |
| 2,815,008 | Hirt | Dec. 3, 1957 |
| 2,845,902 | Anderson | Aug. 5, 1958 |

FOREIGN PATENTS

| 341,511 | Italy | June 27, 1936 |
| 521,657 | Great Britain | May 28, 1950 |
| 866,757 | Germany | Dec. 13, 1952 |